May 13, 1941. D. JOHNSTON Re. 21,798

HYDRAULIC MOTOR

Original Filed May 8, 1937 4 Sheets-Sheet 1

INVENTOR:
DOUGLAS JOHNSTON,
BY Bruce D. Elliott
ATTORNEY.

May 13, 1941. D. JOHNSTON Re. 21,798

HYDRAULIC MOTOR

Original Filed May 8, 1937 4 Sheets-Sheet 2

INVENTOR:
DOUGLAS JOHNSTON,
BY Bruce S. Elliott
ATTORNEY.

May 13, 1941. D. JOHNSTON Re. 21,798
HYDRAULIC MOTOR
Original Filed May 8, 1937 4 Sheets-Sheet 3
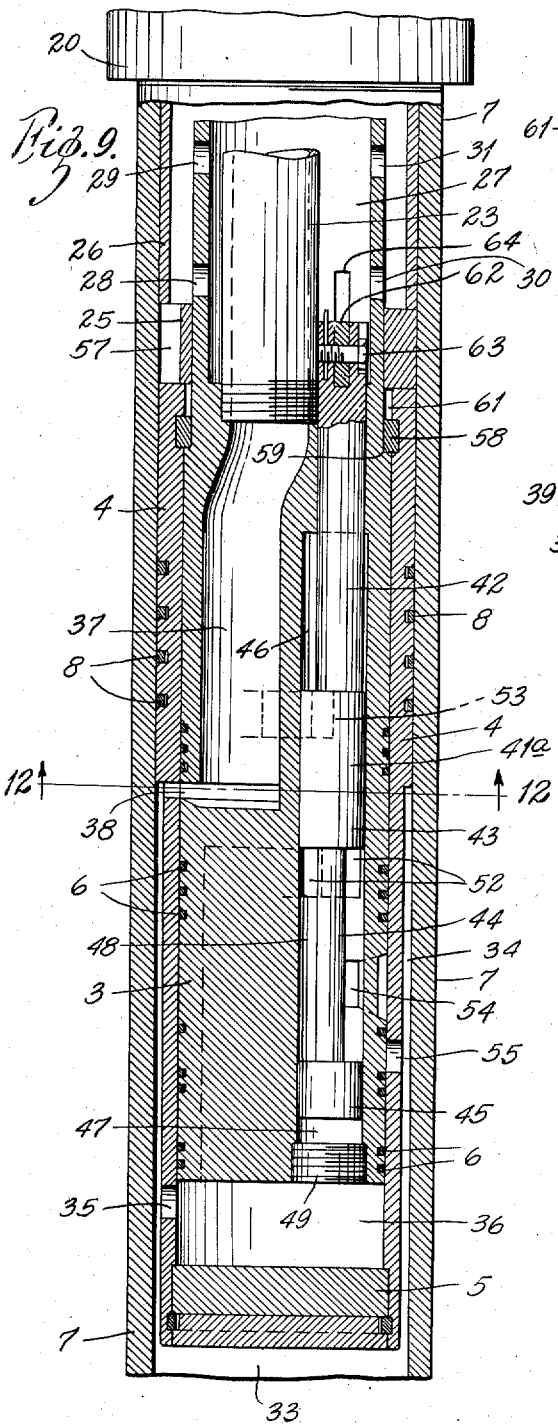
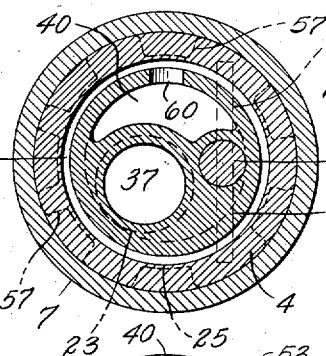
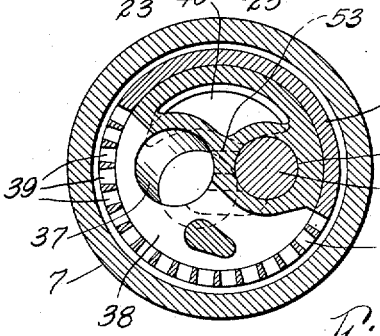
Fig. 12.
INVENTOR:
DOUGLAS JOHNSTON,
BY Bruce D. Elliott,
ATTORNEY.

May 13, 1941. D. JOHNSTON Re. 21,798
HYDRAULIC MOTOR
Original Filed May 8, 1937 4 Sheets-Sheet 4
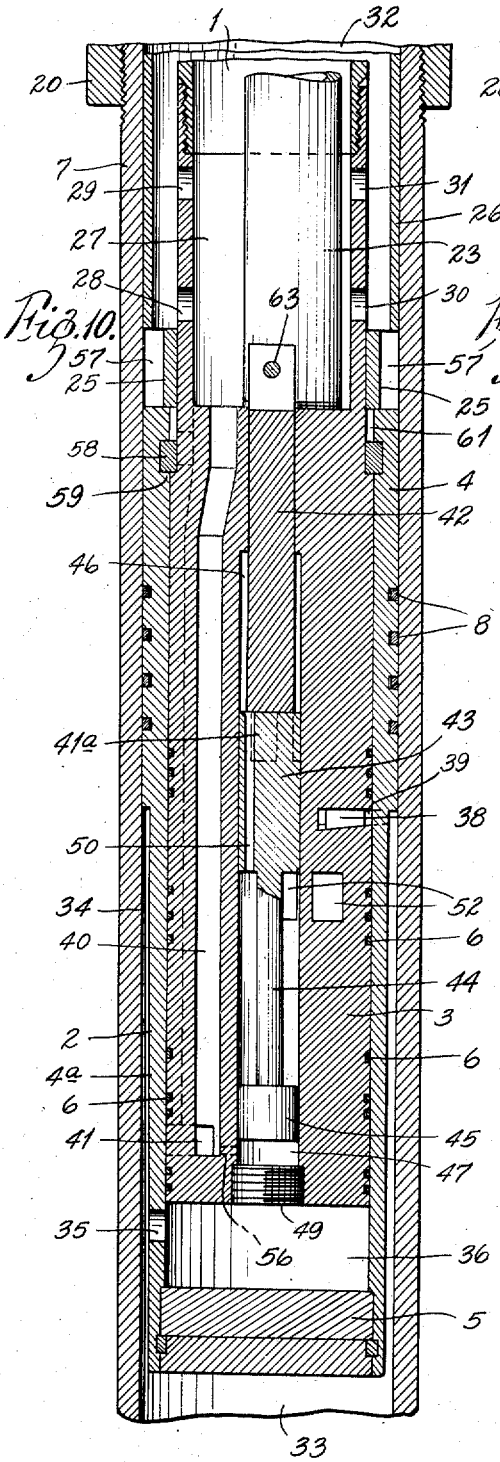
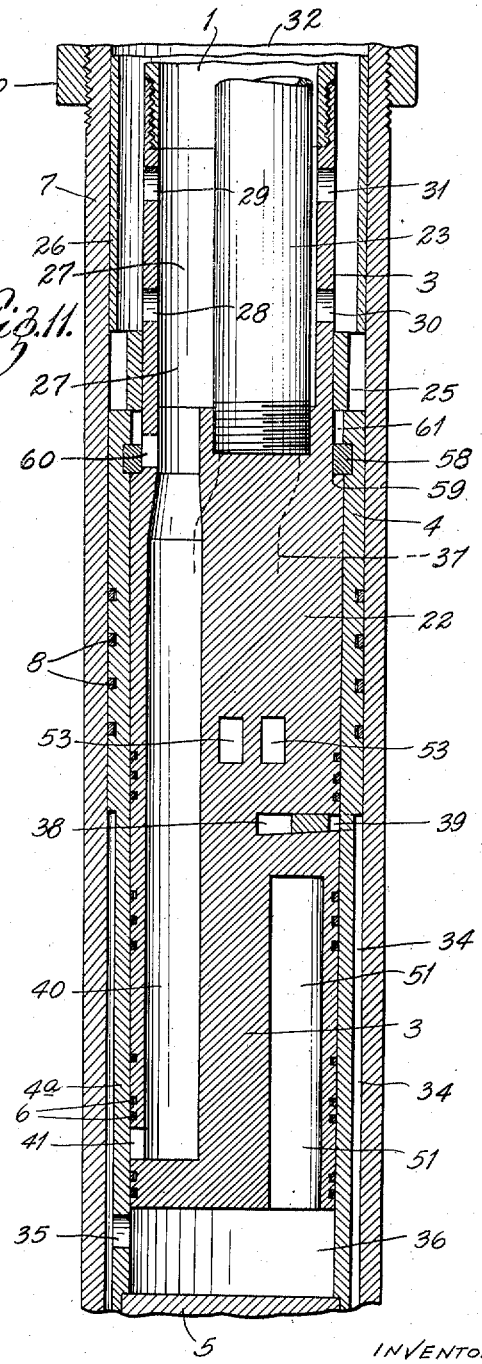
INVENTOR:
DOUGLAS JOHNSTON,
By Bruce S. Elliott
ATTORNEY.

Reissued May 13, 1941

Re. 21,798

UNITED STATES PATENT OFFICE 21,798

HYDRAULIC MOTOR

Douglas Johnston, Shelbyville, Ill.

Original No. 2,128,048, dated August 23, 1938, Serial No. 141,441, May 8, 1937. Application for reissue January 22, 1940, Serial No. 315,093

19 Claims. (Cl. 121—158)

This invention relates to certain new and useful improvements in a hydraulic motor in the form of a tramper for use, particularly in packing cotton, and has for its general object to provide a highly simplified device of this character which shall be positive and reliable in operation and which shall use the minimum amount of oil, or other driving medium and in operation shall require neither a high degree of skill nor extended previous experience for its ready and successful use.

Owing to simplicity of construction, compactness, and relative small size, my improved tramper may be manufactured at small cost as compared with other trampers now in use, and being, aside from the pressure pump and source of fluid, entirely self-contained, it may be readily transported from place to place without danger of breaking, or otherwise harming it.

My improved tramper comprises a hollow piston-rod fixedly secured at its upper end in an overhead support and having at its lower end a unitary enlargement provided with certain ports and passages and constituting a stationary piston, a floating sleeve provided with cooperating ports and slidably mounted on said piston and piston-rod, and having for its purpose to act as a valve for automatically changing a flow of oil at each end of the stroke so as to reverse the direction of the ram case, or tramper proper, and keep it going continuously; an outside floating case carrying at its lower end the tramper foot, constituting the tramper proper, and slidably mounted on said sleeve and piston-rod, and a floating plunger-valve for opening or closing certain ports to release pressure in said sleeve and case, or to permit the same to be built up, and to prevent the escape of high pressure oil, according to its position.

Thus my device has but three moving parts, namely, the outer case, the sleeve and the plunger-valve, all of which are automatically operated, the sleeve and plunger-valve in part by oil pressure and in part by contact therewith of the outer ram case, or a part carried thereby, and the ram case solely by oil pressure produced in the same above or below the sleeve, according to the direction of movement to be imparted to said case and the tramper foot carried thereby.

I have stated that my invention is intended particularly for use in packing cotton. I am aware that the principle of hydraulically operating a reciprocable member, such as the ram case, or tramper, of my invention, herein described and set forth in the appended claims, is applicable, without change of the generic principle involved, to many other kinds of devices. I have in mind oil drilling machines, pneumatic machines of various types, pumps, compressors, pile drivers, forging hammers, and many other types of machines, to any one of which my invention may be applied, with or without suitable modifications adapting it to a particular application, but without departing from the principle of the invention.

I wish to state further, that while the present form of invention contemplates the use of oil, placed under pressure by a pump, as the driving medium for operating the tramper, other mobile mediums could be utilized for this purpose including gas, steam, air and water. Wherever, in the following description and claims, the use of oil is referred to as the driving medium, it is to be understood that such term is employed as typical of various fluids or liquids which might be employed, and is not intended to exclude the use of steam, gas, air, or in fact, any other mobile driving medium which it might be found could be utilized as the driving medium for operating the tramper, or any other device employing a reciprocating member.

Finally, it remains to be stated that in illustrating my invention I have omitted any showing of the press box into which the cotton is packed by the tramper, or the lint slide and bat feeder commonly associated therewith, as these parts do not in any manner enter into the operation of the tramper and their use and application are perfectly well-known to those skilled in the art.

The invention is illustrated in the accompanying drawings, in which—

Figure 8 is a cross-sectional view taken on the line 8—8 of Figure 7 and viewed in the direction of the arrows;

Figure 3:
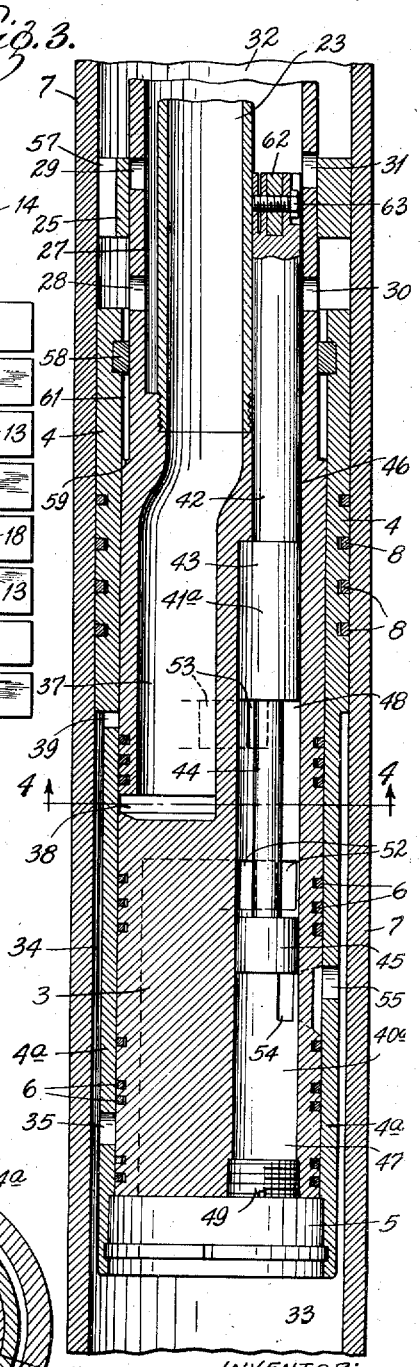
Figure 3 is a longitudinal sectional plan view on an enlarged scale taken on the line 3—3 of Figure 6 through the piston and sleeve the latter being in its uppermost position and showing a portion of the ram case and of the hollow piston-rod.
Figure 5:
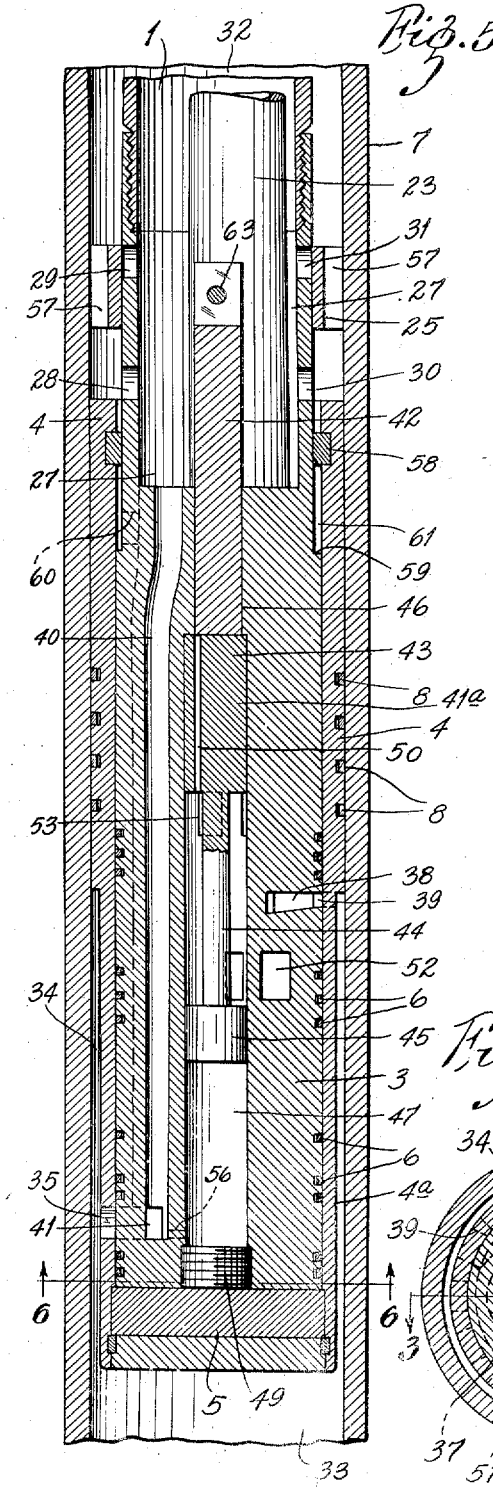
Figure 5 is a view similar to Figure 3 but taken on the line 5—5 of Figure 6 and viewed in the direction of the arrows.
Figure 7:
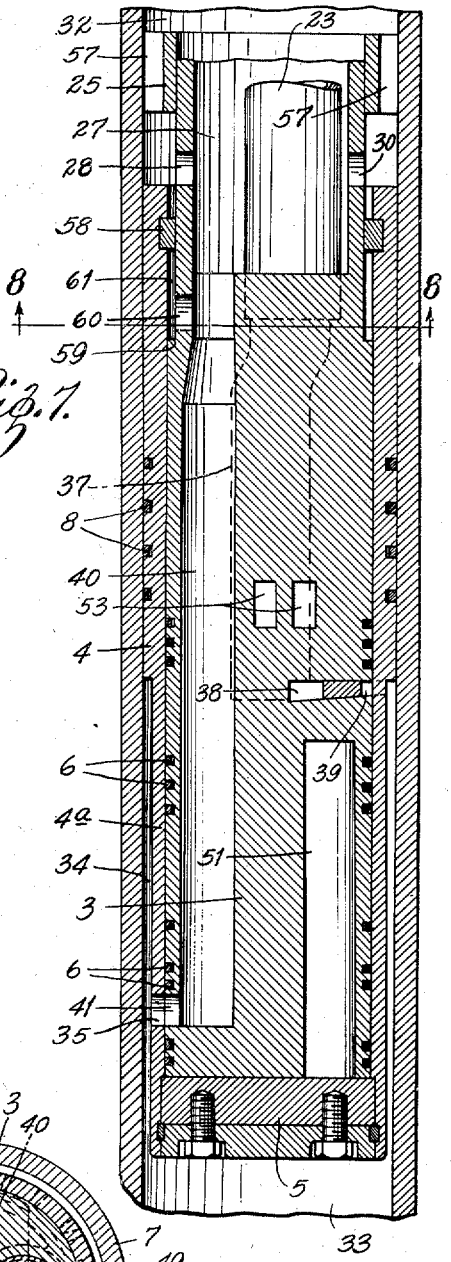
Figure 7 is a central vertical sectional view on the same scale as Figure 3, taken on the line 7—7 of Figure 4 and viewed in the direction of the arrows.

Figures 9, 10 and 11 are views corresponding respectively, to Figures 3, 5 and 7, but showing in each view the sleeve in its lowermost position; and Figure 12 is a cross sectional view taken on the line 12—12 of Figure 9 and viewed in the direction of the arrows.

Referring now to the drawings, the numeral 1 indicates a hollow piston-rod, which is fixedly secured at its upper end in a casting 2, into which it is screwed. At its lower end the piston-rod is secured into the upper end of a stationary piston 3. Slidably mounted on this piston is a sleeve 4 having a closed lower end 5. Piston rings 6 are interposed at intervals between piston 3 and sleeve 4. The numeral 7 indicates the ram case which is mounted to slide up and down on the piston-rod 1 and likewise has slidable and sealing contact with the sleeve 4. To this end, piston rings 8 are interposed between the ram case and the sleeve. The lower end of the ram case is sealed by a plug, 9, which is welded into the ram case pressure tight. Mounted on the lower end of the ram case is a rectangular tramper foot, 10, which consists of a number of boards bolted to the bottom of two parallel channel irons, 11. On top of these channel irons is bolted a flat plate, 12, which is provided with a central aperture through which the plug 9 and the lower end of the ram case may be passed in securing the tramper foot onto the ram case. Welded between the two channel irons 11 are two spreaders, 13, which are placed so as to hold snugly between them the bottom plug 9, which is held by a pin, 9a, passing through the two spreaders 13.

The tramper proper is supported by the sills, 14, which are in this case channel irons. At one end the sills are bolted at the bottom to a vertical channel iron, 14a, which is bolted at the bottom to the press sills, which are in turn bolted to the concrete press foundation. The other ends of the tramper sills are bolted to the center column of the press (not shown). This is usually a square or round steel column upon which the double box press revolves. The bottom of the center post or column is also bolted to the press sills, mentioned above. In its reciprocation, the ram case 7 is guided and kept aligned by a guide, 15, which is in turn held to the sills 14 by flat plates, 16 and 17 bolted to said sills.

Figure 1:
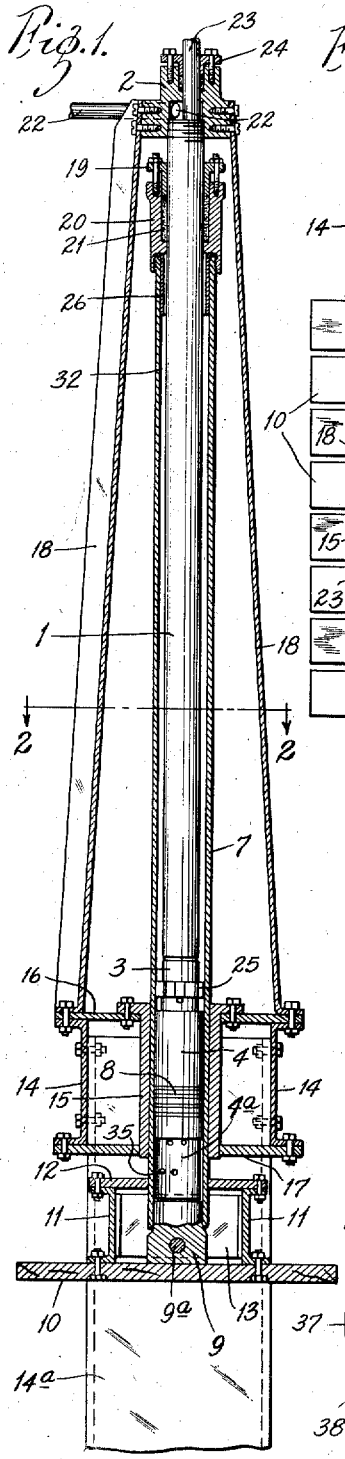
Figure 1 is a vertical sectional view of the tramper assembled.
Figure 2:
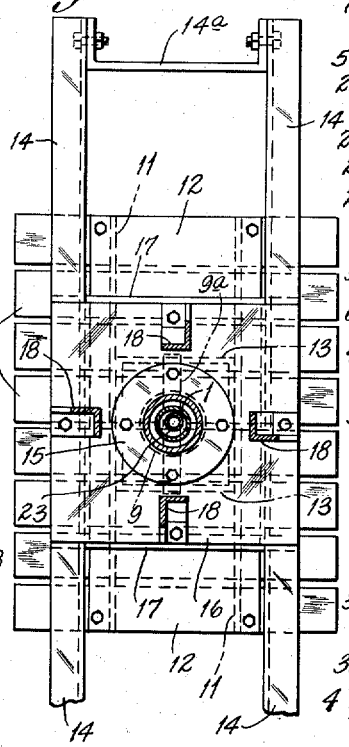
Figure 2 is a sectional plan view taken on the line 2—2 of Figure 1.

The casting 2, at the upper end of the tramper, and into which the upper end of the piston-rod is screwed, is held rigidly by the tension angles, 18, (Figs. 1 and 2), which in turn are bolted at their lower ends to the sills 14 through plate 16. The piston-rod 1 must, of course, withstand the reaction from the ram case, due to the force exerted in packing the cotton, and also due to the downward force caused by raising the ram case. This force is transmitted through the piston-rod to casting 2 and then down to the sills 14 through tension angles 18.

To prevent leakage of the ram case 7 and piston-rod 1, there is provided on the ram case a packing gland consisting of the parts indicated by the numerals, 19, 20 and 21, of conventional construction and arrangement, the part 21 being the packing.

Oil under pressure is admitted into the hollow piston-rod 1 through a pipe, 22, (Fig. 1) screwed into casting 2 whence it passes down through the inside of the piston-rod. The oil is discharged through discharge pipe, 23, (Figs. 1, 3 and 7), which extends downward through piston-rod 1 to the piston 3, into the top of which it is screwed. To prevent leakage of high pressure oil where pipe 23 passes through the top of casting 2, a packing gland, 24, is provided.

Slidably mounted on piston 3 above the sleeve 4 is a ring, 25, (Figs. 1, 3, 5 and 7). Screwed flush by the stuffing box 20 against the top of the ram case 7 is a sleeve, 26. The sleeve 4 acts as a valve to automatically change the flow of oil at each end of the stroke of the ram case so as to reverse its direction and keep it going continuously. In the downward movement of the ram case the sleeve 26 will engage the ring 25 which will in turn engage the top of sleeve 4 to move the sleeve downward. The ring 25 merely acts as an auxiliary plunger, in connection with sleeve 26, this arrangement being provided in order to prevent the necessity of having ram case 7 move down so far that the packing 21 would be cut by the joint between piston rod 1 and piston 3. In each downward movement of the ram case the sleeve 26 operates to push sleeve 4 down to its extreme lowermost position.

In its extreme lowermost position sleeve 4 will have opened an outlet to the lower inside of the ram case, which relieves the pressure therein, allowing the high pressure oil being pumped into the upper chamber to raise the ram case. As soon as the ram case reaches its uppermost position, the bottom plug 9 will have engaged sleeve 4 and shifted it back to its extreme uppermost position, in which position it will have closed the outlet to the lower chamber and opened a passage for the high pressure oil to be pumped into the lower chamber. At the same time, this same passage will allow the oil in the upper chamber to also flow into the lower chamber. Hence, the cycle of operation is completed and the tramper starts down on the next cycle. The arrangement of parts by means of which the foregoing operation of the tramper is effected by the inlet of pressure oil to the piston will now be described, referring to Figures 3 to 11 inclusive of the drawings.

In its upper portion, the piston 3 is provided with a hollow portion, or chamber, 27, (Figs. 3, 5 and 7), the wall of which is provided on opposides with ports, 28, 29 and 30, 31, separated equal distances from each other. The sleeve 4, in the portion thereof occupied by the piston rings 8, divides the ram case 7 into an upper chamber 32 (Fig. 1) and a lower chamber 33 (Fig. 3) and the ports 29—31 communicate with the upper chamber 32 above the level of the top of sleeve 4 when the latter is in its uppermost position, as shown by Figs. 3, 5 and 7.

The sleeve 4 in its lower portion, that is in the part 4a thereof below the bearing portion containing the piston rings 8, is reduced in diameter to provide an annular space 34 between its wall and the wall of the ram case 7. Toward the lower end of this reduced portion the wall of the sleeve is provided with a port 35, which is located at such distance above the bottom 5 as to be moved beyond the lower end of the piston 3 when the sleeve is moved to its extreme lower position so as to open communication between the lower chamber 33 and a chamber 36 provided between the bottom 5 of the sleeve and the lower end of the piston 3 when the bottom of the sleeve is moved downward, or away from the lower end of the piston (Figures 9 to 11). The piston 3, below the portion thereof containing the chamber 27, is cored out to provide an outlet passage 37, the outlet pipe 23, extending through the chamber 27 at a distance from its wall, being screwed into the piston 3 at the upper end of the outlet passage, 37, in a manner to form a continuation of said passage (Figures 3 and 7). At the bottom of the outlet passage 37 the wall of said passage and the body of the piston is cut through to provide an enlarged or circumferential port, 38, (Figures 3, 4 and 7) which, when the sleeve is in its lowermost position (Figures 9 to 11) registers with a circumferential series of ports, 39, formed in the wall of the reduced portion 4[a] of sleeve 4 at the upper end thereof. When the ports 38 and 39 are in register they establish communication from the lower chamber 33 of the ram case through the annular passage 34 to the outlet passage 37.

To provide for the passage to the lower chamber 33 of the ram case of pressure oil passing through the hollow piston rod 1 to the chamber 27 of the piston, the latter is provided with an inlet passage, 40, extending longitudinally through the piston from the bottom of chamber 27 to near the bottom of the piston where a port, 41, is provided leading from the bottom of inlet passage 40 to the outer side of the piston (Figures 5, 7, 10 and 11). When the sleeve is in its uppermost position, as shown by Figure 7, the port 41 of the piston is in register with the port 35 of the sleeve 4, previously referred to, which permits the pressure oil to pass directly from the chamber 27 through passage 40, ports 41 and 35, and annular passage 34 to the lower chamber 33 of the ram case.

In order to control the application of the pressure oil effective within the chamber 36 of the sleeve, to permit, or prevent, the movement of said sleeve in the downward or upward movement of the ram case, so that said sleeve may function at the proper stage of said strokes to close or open the ports controlling the application of the pressure oil to the ram case, the following construction is provided, referring to Figures 3 to 6, and Figures 9, 10 and 12 of the drawings:

The piston 3 is longitudinally cored from its lower end to near its upper end to provide a cylindrical bore, 40[a], (Figures 4 and 12) in which is slidably mounted a plunger-valve, indicated generally by the numeral 41[a] (Figures 3, 5, 9 and 10). This plunger-valve comprises, preferably as an integral structure, a plunger-rod, 42, having at its lower end a plunger-valve, 43; below said valve a reduced portion, 44, and at the lower end of the portion 44 a small foot-valve, 45. The valves 43—45 divide the bore 40[a] into an upper valve-chamber, 46, (Figures 9 and 10) and the lower valve chamber, 47, (Figures 3 and 5). Between the valves 43 and 45 the reduced portion 44 provides an annular intermediate valve-chamber, 48. The lower end of bore 40[a] is closed by a screw-plug, 49. A small longitudinal bore, 50, extending through valve 43 from end to end thereof serves to afford communication between the intermediate valve-chamber 48 and the upper valve-chamber 46 for a purpose to be presently described. The piston 3 is further provided with a cored hole, 51, extending from its under side, from the upper end of which ports, 52, (Figures 3, 5, 6, 9 and 10) lead into the intermediate valve-chamber 48, whereby communication from sleeve chamber 36 through hole 51 and ports 52 with the intermediate valve chamber 48 may be established. From the intermediate valve chamber 48 ports, 53, (Figs. 3, 4, 6 and 7) communicate with the outlet passage 37. Leading from the lower valve chamber 47 are ports, 54, which extend through the wall of said chamber (Figures 3, 6 and 9) and which, when the sleeve 4 is in its uppermost position, as shown in Figure 3, are in communication with ports, 55, extending through the wall of the sleeve whereby communication may be established between the annular space 34 and said ports with the lower valve chamber 47. When the plunger valve 41[a] has been lowered, as hereinafter described, the ports 54 and 55 will be placed in communication with the intermediate valve chamber 48 and hence with ports 52, which movement of the plunger valve occurs prior to the downward movement of sleeve 4, so that pressure oil from the lower ram case chamber 33 may pass through annular space 34 ports 55, 54 and 52 through cored hole 51 to the sleeve chamber 36, thus balancing the pressure on both sides of the sleeve. Hence, no resistance will be offered to the subsequent downward movement of said sleeve.

In order to maintain the plunger valve 41[a] in its upward position prior to the time it is moved downward by contact of sleeve 26 at the upper end of the ram case 7 with the slide ring 25, which in turn is adapted to engage the plunger rod 42, the small port 56 is provided which permits high pressure oil from the inlet passage 40 to enter valve chamber 47 and thus exert upward pressure on the bottom of the plunger valve. (See Figures 5 and 10.)

The portion of the piston 3 above the bearing portion thereof provided with the piston rings 6 is reduced in diameter and on this reduced portion is slidably mounted the ring 25, previously referred to. This ring is fluted on the outside to provide ports, 57, (Figures 3 and 8) to allow free passage of oil on the downward stroke of the ram case from the upper chamber 32 to ports 28 and into the hollow port 27 of piston 3. Mounted in a circular groove provided in the interior wall of sleeve 4 at its upper end is a stop ring, 58 (Figure 3), which also is adapted to slide upon the said reduced portion of the piston. This reduced portion provides a circular shoulder, 59, which will serve to limit the downward movement of sleeve 4 when engaged by the stop ring 58.

Figure 4:
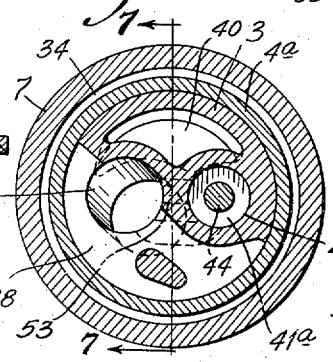
Figure 4 is a cross-sectional view taken on the line 4—4 of Figure 3, viewed in the direction of the arrows.
Figure 6:
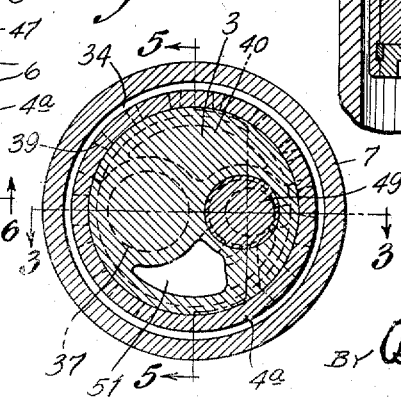
Figure 6 is a cross-sectional view taken on the line 6—6 of Figure 5 and viewed in the direction of the arrows.

In order to cushion the sleeve 4 at the extreme limit of its downward movement, in case the tramper should be operated without packing cotton, I provide a port, 60, best shown in Figures 7 and 8, which port is relatively wide at its upper end, and tapers to a mere slit at its lower end. This port is provided in the wall of the inlet passage 40 and hence oil may pass through said port to the annular space, 61, surrounding the reduced portion of the piston and closed at its upper end by stop ring 58. As the sleeve 4 is moved downward, the gradually decreasing area of port 60 offers increasing resistance to the expulsion of oil through said port by stop ring 58 and causes the movement of the sleeve to be slowed down. The operation of the tramper will now be described, first premising that Figures 1, 3, 5 and 7, and the sectional views, Figures 4, 6 and 8, illustrate the position of parts when the ram case 7, sleeve 4 and plunger valve 41 are in their uppermost position; while Figures 9, 10, 11 and 12 illustrate the position of parts when said elements are in their lowermost position.

Referring now to the first-named figures of the drawings, with the ports in the position shown, oil under high pump-pressure entering the inlet pipe 22 passes down through the hollow piston rod 1 into piston chamber 27, through inlet passage 40, out of port 41 in piston, through registering port 35 in sleeve 4, along annular passage 34 between ram case 7 and said sleeve, and into lower chamber 33 of the ram case. At the same time, oil, under the same pressure, is flowing out of the upper chamber 32 of the ram case through ports 28 and 30 into piston chamber 27 and in the same manner as described to the lower chamber 33 of the ram case. Since on the downward stroke the high pressure oil is exerting pressure in both the upper and lower chambers of the ram case, the force in the lower chamber tending to push the ram case 7 down, and the force in the upper chamber tending to push it up, it will be seen that the net force available for packing the cotton will be equal to the difference between the areas which are filled with oil in the upper and lower chambers. In other words, the force pushing the ram case down will be equal to the pump pressure times the net area it acts against. The area the pressure acts against downward is the area of the inside of the ram case, while the area it acts against upward is equal to the same area diminished by the area of the piston-rod 1. Therefore, the net area downward is equal to the area of said piston-rod. It follows that the force the tramper will exert is equal to the area of the piston-rod times the pressure developed by the pump.

On the downward stroke there are no outlets open. This feature of the invention reduces the quantity of oil needed to operate the tramper. The amount of oil required to drive the tramper down is equal to the area of the piston-rod multiplied by the length of the stroke.

The plunger valve is held in its upper position by high pressure oil passing through the small port 56 to valve chamber 47 from the inlet port 40. At the same time pressure oil passes from the lower chamber 33 of the ram case through annular space 34 and ports 55, 54 to said valve chamber. The intermediate valve chamber 48 is in communication with the cored hole 51 in the piston through ports 52 and with the outlet 37 through ports 53. Chamber 36 in the lower end of sleeve 4 communicates through cored hole 51 in the piston 3, and ports 52 with the intermediate valve chamber 48. This communication exists always. In this position, there is no pressure in the lower chamber 36 of sleeve 2.

The upper plunger chamber 46 has zero pressure since it communicates through port 50 in valve 43 with the intermediate valve chamber 48, which is in communication with outlet 37 through ports 53.

While pump pressure acts on the upper end of the plunger rod 42 in piston chamber 27, since the area of this plunger rod is less than that of valve 43, there will be a net force to hold valve 3 in its upper position.

As the ram case 7 moves downward under the pressure of oil in its lower chamber 33, the first event occurs when sleeve 26 (Figure 1) engages ring 25 which in turn engages plunger rod 42 to move the plunger valve 41a downward. To facilitate this operation I preferably secure a bar, 62, (Figure 3) to the upper end of the pressure rod by means of a bolt, 63. This bar extends clear through the walls of piston chamber 27 into ring 25 to which it is secured (Figure 8). The walls of chamber 27 are slotted to allow the bar 62 to move up and down, one of these slots being shown by full lines in Figure 9 and indicated by the numeral 64. Bar 62 will therefore be engaged at opposite ends by ring 25 as the latter is moved downward, as will be apparent from inspection of Figure 8. As the plunger valve moves down, the valve 43 will cover ports 53 before ring 25 has moved down far enough to engage sleeve 4, and foot-valve 45 will first cover and then uncover ports 54 to place them in communication with the intermediate valve-chamber 48 and ports 52. At this stage, i. e., with the plunger-valve lowered to substantially the position shown in Figure 9, but with sleeve 4 in the raised position in Figure 3, the high pressure oil in lower chamber 33 is in communication with the sleeve chamber 36 by means of annular space 34, ports 55 and 54, intermediate valve chamber 48, ports 52 and the cored hole 51. Therefore, the pressure inside chamber 36 is the same as outside and sleeve 4 will offer no resistance to being pushed down. The ring 25 now engages the upper end of sleeve 4 and pushes the sleeve down moving port 35 beyond port 41 of inlet passage 40, thereby closing port 41 and cutting off passage of pressure oil to the lower chamber 33 of the ram case. The pressure on the lower end of sleeve 4, both inside and out, is now the same as at the upper end, and the sleeve is therefore "floating," therefore only a slight force is required to move it down, which is only the amount of force required to overcome a small frictional resistance. Also, except for the small force needed at first to hold down plunger-valve 41, as explained later on, the same force is available for packing cotton as was available at the beginning of the downward stroke, namely, the oil pressure times the area of piston rod 1.

The oil is now flowing only into upper chamber 32, and no outlets are open. Therefore, this oil will move sleeve 4 down until port 35 in sleeve 4 opens into chamber 36, Figure 9, which affords another means of allowing the oil in chamber 33 of the ram case and chamber 36 of sleeve 4, to communicate. In this movement of the sleeve port 55 will be moved beyond port 54, closing the latter. The downward movement of sleeve 4 just described is permitted by the fact that the ram case 7 moves downward simultaneously with the sleeve, but at a slower rate, increasing the length of chamber 36 to provide space for the oil displaced by the downward travel of the sleeve. Thus, as stated, the sleeve is floating, since on its upper end, chamber 27 and ports 57; inside its lower end, chamber 36; and outside its lower end, chamber 33, all pressures are the same, and equal to the pump pressure, disregarding a slightly greater pressure in the upper chamber 27 due to the frictional resistance offered to movement by the sleeve. The latter is now free to move down because there is no fluid pressure or mechanical obstruction holding it up. At this point the sleeve is merely a floating connection between the fluid in the upper and lower portions, 32 and 33, respectively, of the ram case. The oil pressure in the lower chamber is acting over the entire area of the inside of the ram case, while in the upper chamber the same pressure is acting only over the area of the inside of the ram case, less the area of the piston rod. Therefore, as before, the net force exerted by the ram is equal to the pump pressure times the difference between the area in the lower and upper chambers, which area is equal to the area of the piston rod. If, now, it be assumed that sleeve 4 does not move downward at this point, then the oil being pumped into the upper chamber 32 through hollow piston rod 1, will immediately increase in pressure and act on the upper annular end of the sleeve, forcing the sleeve down against the oil in lower chamber 33 of the ram case. This will cause the pressure in this chamber to rise equally (or nearly so) in amount to the rise of pressure in the upper chamber. However, the oil in the lower chamber 33 acts downward on the end of the ram case 7 on an area much larger than the annular area of chamber 32 of the upper end of the ram case. Therefore, the ram case will have a greater increase in force downward and will travel downward, increasing the area of lower chamber 33, allowing sleeve 4 to slide downward. Finally, ports 39 in sleeve 4, (Figure 12), are moved into register with port 38 in piston 3 to relieve pressure in chamber 33 by providing an outlet through annular passage 34, ports 39 and 38 and outlet passage 37.

At this point, pressure both inside and outside of sleeve 4, including chamber 33 of the ram case and chamber 36 of the sleeve has been reduced to zero, and the sleeve has reached its lowermost position. The oil pressure in the upper ram case, chamber 32 will hold sleeve 4 down in this position and force the ram case to proceed upward, the oil in the lower chamber 33 being discharged.

At this point, it may be desirable to explain what holds the sleeve 4 in its uppermost position for substantially the duration of the downward stroke of the ram case, since in both upper chamber 32 and lower chamber 33 the pressures are equal and the friction of the ram case tends to pull the sleeve down. This is best explained by assuming that sleeve 4 does slip down closing ports 41 and 35, and cutting off the admission of oil into the lower chamber 33. Now, as pressure oil is still being pumped, the immediate effect will be a sudden rise of pressure in the upper chamber 32. This rise of pressure in the upper chamber, when considered alone, will act against the area of sleeve 4, tending to push it down further. However, this pressure also acts against the top area of the upper chamber 32. This will naturally tend to force the ram case up. The effect of this will raise the pressure of the oil in the lower chamber 33. Of course, it will not raise it nearly as high as the pressure in the upper chamber. Now, chamber 36 of the sleeve has zero pressure in it and as the area is equal to the area of the piston 3, the slight increase of oil pressure in the lower chamber 32 acts over a large area, unopposed by pressure from the other side. Always to be considered is the fact that the oil in chamber 33 acts against the area of the sleeve as well as that area equal to the piston area. The areas are so proportioned that the pressure increase in the lower chamber, (due to the increase of pressure in the upper chamber acting upon the top of the ram case) tending to push the sleeve up against the entire area of the inside of the ram case, of which area an amount of area, equal to the piston area, has no pressure at all acting on the other side, pushes up on the sleeve with a greater force than the force in the upper chamber pushes down. The result is that the sleeve can not slip down for as soon as it closes ports 35 and 41 slightly, a rise in pressure pushes it back.

I have heretofore referred to the small force needed at first to hold the plunger valve down as the ram case approaches the limit of its downward movement. An explanation of this will now be given.

At the completion of the downward stroke, the first event occurs when the plunger-valve closes ports 53, thereby closing the outlet from sleeve chamber 36. This requires a certain amount of force, which will have to be deducted from the force the tramper will exert for packing cotton. However, as soon as ports 53 are closed and ports 54 begin to open, no force will be required to push the plunger-valve for the remainder of the downward stroke. The reason for this is that as soon as ports 53 are closed and ports 54 begin to open, the oil pressure in the intermediate valve chamber 48 will be the same as the pressure in the lower valve chamber 47, and through the port 50 in valve 43 the upper valve chamber 46 will also have the same pressure. Since the pressure acting against the top of plunger-rod 42 is equal to the same pressure as in valve chambers 46 and 47, all pressure will be the same and no force will be required to hold or push down the plunger valve.

Notwithstanding the above, one is not justified, actually, in deducting the force required for pushing down the plunger-valve from that force the tramper would otherwise exert. In packing cotton, the last few inches of movement of the tramper require very great increase in force. Now at the time the force required to push down the plunger-valve is neutralized, the tramper is still over an inch from the end of the stroke. To this point to the end of the stroke, the rise in force required to pack the cotton greatly exceeds the force that was required by the plunger-valve. This is only to say that if a maximum force of 14,000 pounds is required at the end of the stroke, a force less in magnitude by the small amount required for the plunger-valve for the duration of about one inch, when the tramper is still within several inches of the end of the stroke, will not lessen the packing power of the tramper. It is also obvious that the only force necessary to overcome in pushing down the plunger-valve, is that force designed to push the plunger valve up against the resistance of gravity and friction.

As soon as the ram case starts upward the high pressure oil communicating from cored inlet hole 40 through small port 56 to lower valve chamber 47 will force the plunger-valve back into its uppermost position, or that shown in Figure 3. Since ports 54 and 55 are closed at this time, this high pressure oil cannot run out of chamber 47 into the annular space 34 to the lower chamber 33 and be wasted to the outlet. This is the reason ports 54 and 55 need to be closed. Also, when the plunger valve moves up it provides an additional outlet from lower chamber 33, through the annular space 34, port 35, chamber 36, the cored hole 51, ports 52, intermediate valve chamber 48, and ports 53, to the outlet passage 37. However, when the sleeve is shifted upward, ports 54 and 55 will open before port 35 in sleeve 4 closes communication with chamber 36, which is connected to the outlet. Therefore, there will occur a momentary leakage of oil from inlet passage 40 through port 56 to chamber 47, through ports 54 and 55, annular space 34, port 35 to chamber 36, out through the cored hole 51, ports 52, intermediate valve chamber 48, ports 53, to outlet 37.

This leakage will only be momentary as the sleeve 4 is moving up rapidly at this point. Also port 56 is so small that in the time available no appreciable amount of oil can flow through it.

With the plunger valve in its uppermost position, as described, a means of escape of oil from sleeve chamber 36 to outlet 37 is provided through the cored hole 51, ports 52, intermediate valve chamber 48, and ports 53. As the ram case nears its uppermost position the bottom plug 9 engages sleeve 4 and raises it. This movement of the sleeve is permitted by reason of the fact that the top of the ram case is of larger area than that of the sleeve, as is obvious from an inspection of the drawings. Accordingly, if the oil acts upward on a larger area of the ram case than it acts down on the sleeve, the ram case will raise the sleeve, due allowance having been made for the weight of the ram case. As the sleeve rises, it will close outlet ports 38 and 39 and port 35 in said sleeve, which allowed lower chamber 33 another outlet through annular space 34 into sleeve chamber 36. The plunger valve is still maintaining an outlet from this chamber, as explained above. Since the outlet to the lower chamber 33 is closed, and since the oil is being pumped into the upper chamber 32 against the upper area of the ram case, the oil pressure in the lower chamber 33 will build up, and with no pressure inside the sleeve, the latter will move to its uppermost position, as has previously been explained in describing the manner in which the sleeve was held up during the downward movement of the ram case.

After the sleeve and ram case have been raised, in the manner just described, the parts will then be in the position as shown in Figure 3 and the downward movement of the ram case under the pressure of oil will be repeated in the manner which has been described.

From the foregoing it will be seen that I have provided an exceedingly simple construction of tramper having, as stated, only three moving parts, and as these parts are constantly lubricated by the oil pumped into the tramper in the operation thereof, there is practically no wear due to friction, and as the moving parts are not mechanically connected, there is no part of the tramper which is liable to get out of order. At the same time, the efficiency of the device is very great, and due to the fact that the oil in the upper chamber discharges into the lower chamber, instead of to the outlet, the amount of oil required to be pumped to operate the tramper is reduced to the minimum.

I claim:

1. A double-acting hydraulic motor comprising a stationary piston, a reciprocable cylinder cooperating therewith and providing working chambers on opposite sides of said piston having different pressure areas, means for supplying pressure liquid to said cylinder, a sleeve slidably mounted and reciprocable on said piston and automatically reciprocated to cause the effective force of said pressure liquid to be exerted against the upper and lower ends of said cylinder in alternation, said piston and sleeve being provided with cooperating ports, and a valve automatically operated to control the reciprocation of said sleeve.

2. A double-acting hydraulic motor comprising a stationary piston, a reciprocable cylinder slidably mounted thereon and providing working chambers on opposite sides of said piston having different pressure areas, means for supplying pressure liquid to said cylinder, a floating sleeve slidably mounted on said piston and interposed between the latter and said cylinder, and automatically shiftable, in part by the movement of the cylinder and in part by differential pressures within the cylinder to cause the effective force of the pressure liquid to be exerted against the upper and lower ends of said cylinder in alternation, and a slide valve governing certain ports in said sleeve and adapted to be automatically reciprocated to control the movement of the sleeve at the termination of the stroke of the cylinder in either direction.

3. A double-acting hydraulic motor comprising a stationary piston, a reciprocable cylinder slidably mounted thereon and providing working chambers on opposite sides of said piston having different pressure areas, means for supplying pressure liquid to said cylinder, a floating sleeve slidably mounted on said piston and interposed between the latter and the cylinder and automatically shiftable to cause the effective force of the pressure liquid to be exerted against the upper and lower ends of said cylinder in alternation, said piston and sleeve having cooperating ports, and a slide valve governing certain of the ports in the sleeve and adapted to be initially actuated by the cylinder in one direction and to be moved in the opposite direction by pressure within the cylinder, said slide valve operating to control the movement of said sleeve at the termination of the stroke of said cylinder in either direction.

4. A hydraulic motor for a tramper comprising, in combination, a stationary piston having an inlet and an outlet passage each of which is provided with a port, a sleeve slidably mounted on the piston having a closed bottom providing, with the bottom of the piston, a sleeve chamber, a ram case slidably mounted on the sleeve and providing upper and lower pressure chambers, to the pressures in which said sleeve is responsive, the upper chamber having a less pressure area than the lower, an inlet and an outlet port in said sleeve co-operating with the corresponding ports in said piston for controlling the admission and discharge of pressure oil to and from said lower chamber, a port in said piston affording communication between said inlet passage and the upper chamber of the ram case, whereby pressure oil admitted to said inlet passage with the ram case and sleeve in their uppermost position will enter said lower pressure chamber and force the ram case downward to cause the upper end of the ram case to engage said sleeve and, supplemented by pressure in the upper chamber, move it downward to change the position of the ports so as to close the inlet to the lower chamber and permit pressure oil to discharge therefrom, while pressure oil entering said upper chamber will thereafter raise said ram case and cause its lower end to engage and raise said sleeve to its uppermost position, and means operating automatically in the described movements of the ram case and sleeve to cause the application of pressure within, or its removal from, said sleeve chamber, to permit the movements of the sleeve.

5. A hydraulic motor for a tramper comprising, in combination, a fixed, depending piston-rod having at its lower end an unitary piston provided with inlet and outlet passages each having ports, a sleeve of greater length than the piston slidably mounted thereon, having a closed bottom, and having ports adapted to cooperate, respectively with ports of the piston, a ram case of greater length than the sleeve slidably mounted thereon providing sealed upper and lower chambers one port in said piston affording communication between its inlet passage and the upper chamber of the ram case, said ram case being adapted at the end of its upward and downward movements to move said sleeve in a corresponding direction, and the latter being responsive to oil pressure in said chambers, the relative disposition of the ports being such that with the ram and sleeve in their uppermost position oil under pressure admitted to said inlet passage will pass into said lower chamber and force the ram case downward, thereby causing said sleeve to be moved to change the position of its ports to shut off the passage of oil to said lower chamber and release the pressure oil therefrom, while pressure oil will enter said upper chamber and thereafter raise the ram case and cause the latter to raise said sleeve, and means automatically operating in the described movements of the ram case and sleeve to control the application of pressure to, or its removal from, said sleeve, to permit the movements thereof.

6. A hydraulic motor for a tramper comprising, in combination, a fixed, depending piston-rod having at its lower end an unitary piston provided with inlet and outlet passages each having ports, a sleeve of greater length than the piston slidably mounted thereon, having a closed bottom, and having ports adapted to cooperate with ports of the piston, a ram case of greater length than the sleeve slidably mounted thereon, providing sealed upper and lower chambers, one port in said piston affording communication between its inlet passage and the upper chamber of the ram case, said ram case being adapted at the end of its upward and downward movements to move said sleeve in a corresponding direction, and the latter being responsive to oil pressure in said chambers, the relative disposition of the ports being such that with the ram case and sleeve in their uppermost position oil under pressure admitted to said inlet passage will pass into said lower chamber and force the ram case downward, thereby causing said sleeve to be moved to change the position of its ports to shut off the passage of oil to said lower chamber and release the pressure oil therefrom, while pressure oil entering said upper chamber will thereafter raise the ram case and cause the latter to raise said sleeve, and a plunger valve automatically operating in the described movements of the ram case and sleeve to control the application of pressure to, or its removal from, said sleeve, to govern the movements thereof.

7. A hydraulic motor for a tramper comprising, in combination, a fixed, depending piston-rod, a stationary piston secured on the lower end thereof, having an inlet and an outlet passage provided, respectively, with an inlet and outlet port, a sleeve slidably mounted on said piston having a closed bottom, a ram case of greater length than the sleeve slidably mounted thereon and providing upper and lower sealed chambers, the upper chamber having a less pressure area than the lower chamber and being in constant communication with said inlet passage, said sleeve having ports controlling communication of said inlet and outlet ports with said lower chamber and being itself responsive to pressures in both of said chambers, the relative disposition of the ports being such that, with the ram case and sleeve in their uppermost position, pressure oil admitted into said inlet passage will pass into said lower chamber and force the ram case downward, causing its upper end to move the sleeve downward to close said inlet port while pressure in the upper chamber will complete the downward movement of the sleeve to open said outlet port, and will thereafter raise the ram case and cause its bottom to raise said sleeve, and means operating automatically in the downward movement of the ram case to balance pressures above and below the bottom of the sleeve to permit of its downward movement, and thereafter to release the pressure above said bottom to permit the upward movement of the sleeve.

8. A hydraulic motor for a tramper comprising, in combination, a fixed, depending piston-rod having at its lower end an unitary piston provided with inlet and outlet passages each having a port, a floating sleeve of greater length than the piston slidably mounted thereon, having a closed bottom providing between itself and the bottom of the piston a sleeve chamber, and having ports adapted to cooperate, respectively, with the ports of the piston, a ram case of greater length than the sleeve slidably mounted thereon and providing sealed upper and lower chambers, a port in said piston affording communication between its inlet passage and said upper chamber, a valve chamber in the piston, a plunger valve mounted therein normally subject on its lower end to pressure from said inlet passage and governing ports in said valve chamber adapted to communicate, respectively, with said lower chamber, said sleeve chamber and said outlet passage, a port in said sleeve controlling the communication of said valve chamber with said lower chamber, the relative disposition of the ports and of pressure areas being such that with the ram case and sleeve in their uppermost position, oil under pressure admitted to said inlet passage will pass into said lower chamber and force the ram case downward, its upper end will move said plunger valve downward to close the outlet port in the valve chamber and admit pressure oil from said lower chamber through the valve chamber into said sleeve chamber, and then move said sleeve downward to close the inlet to the lower chamber, pressure in the upper chamber will next force the sleeve still lower to open the port to said outlet passage, and thereafter raise the ram case, and the plunger valve will be raised by oil pressure to permit oil from the sleeve chamber to pass through the valve chamber to said outlet passage.

9. A hydraulic motor for a tramper comprising in combination, a fixed, depending piston-rod having at its lower end a piston provided with inlet and outlet passages each having ports, a sleeve slidably mounted on the piston having a closed bottom, and having ports adapted to cooperate, respectively, with ports of the piston, a ram case slidably mounted on the sleeve providing upper and lower sealed chambers, one port in said piston affording communication between its inlet passage and said upper chamber, said ram case being adapted at the end of its upward and downward movements to move said sleeve in a corresponding direction, and the latter being responsive to oil pressures in said chambers, the relative disposition of the ports being such that with the ram case and sleeve in their uppermost position, oil under pressure admitted to said inlet passage will pass into said lower chamber and force the ram case downward, thereby causing said sleeve to be moved to change the position of its ports to shut off the passage of oil to said lower chamber and release the pressure oil therefrom, while pressure oil entering said upper chamber will thereafter raise the ram case and cause the latter to raise said sleeve, and a plunger valve subject on its under side to oil pressure from said inlet passage and adapted to be lowered by said ram case in the downward movement thereof, and to be raised by oil pressure in the upward movement of the ram case, and ports controlled by said plunger valve, whereby, in the described movements of the ram case and sleeve, said plunger valve will control the application of pressure to, or its removal from, said sleeve to permit the movements thereof.

10. A hydraulic motor for a tramper comprising, in combination, a fixed, depending rod having at its lower end a piston provided with inlet and outlet passages each having a port, a sleeve slidably mounted on the piston having a closed bottom, and having inlet and outlet ports adapted to cooperate, respectively, with the inlet and outlet ports of the piston, a ram case of greater length than the sleeve slidably mounted thereon providing sealed upper and lower chambers, the upper chamber having a less pressure area than the lower and being in constant communication with said inlet passage, said ram case being adapted at the end of its upward and downward movements to move said sleeve in a corresponding direction, and the latter being responsive to oil pressures in said chambers, the relative disposition of the ports being such that with the ram case and sleeve in their uppermost position, oil under pressure admitted to said inlet passage will pass into said lower chamber and force the ram case downward, thereby causing said sleeve to be moved to change the position of its ports to shut off the passage of oil to said lower chamber and release the pressure oil therefrom, while pressure oil will enter said upper chamber to thereafter raise the ram case and cause the latter to raise said sleeve, and a plunger valve normally responsive on its under side to oil pressure and adapted to be lowered by said ram case in the downward movement thereof prior to the downward movement of said sleeve and to be raised by oil pressure in the upward movement of the ram case prior to the upward movement of the sleeve, said plunger valve operating in its movements to control the application of pressure to or its removal from, said sleeve, to permit the movements thereof.

11. A hydraulic motor for a tramper comprising, in combination, a fixed, depending piston-rod having at its lower end an unitary piston provided with inlet and outlet passages each having a port, a sleeve of greater length than the piston slidably mounted thereon having a lower closed end providing a chamber between itself and the lower end of the piston and having upper and lower ports adapted to cooperate with the inlet and outlet ports of the piston, respectively, a ram case of greater length than the sleeve slidably mounted thereon, providing sealed chambers above and below the sleeve, one port in said piston affording constant communication between its inlet passage and said upper chamber, said ram case being adapted at the end of its upward and downward movements to move said sleeve in a corresponding direction, and the latter being responsive to oil pressure in said chambers, the relative disposition of the ports and pressure areas of said upper and lower chambers being such that, with the ram case and sleeve in their uppermost position, oil under pressure admitted to said inlet passage will pass into the lower chamber of the ram case and force it downward, thereby causing said sleeve to change the position of its ports to close the inlet to said lower chamber while the pressure in said upper chamber will complete the downward movement of the sleeve to open the port to said outlet passage, and move said lower sleeve port beyond the end of the piston to permit the pressure oil in the lower chamber of the ram case to pass through said port into said sleeve chamber, and thereafter raise the ram case, and a plunger valve operating automatically in the described movements of the parts to place said sleeve chamber in communication with said outlet passage to permit the escape of oil from said sleeve chamber as the sleeve is raised.

12. A hydraulic motor for a tramper comprising, in combination, a fixed, depending piston-rod having at its lower end an unitary piston provided with inlet and outlet passages each having ports, a sleeve of greater length than the piston slidably mounted thereon, having a lower closed end providing a chamber between itself and the lower end of the piston, the pressures inside and outside of which are initially equalized and having an inlet and outlet port adapted to cooperate with the inlet and outlet ports of the piston, a ram case of greater length than the sleeve slidably mounted thereon, providing upper and lower sealed chambers, the lower chamber having a greater pressure area than the upper chamber, and the latter chamber being in constant communication with said inlet passage, said ram case being adapted at the end of its upward and downward movements to move said sleeve in a corresponding direction, the relative disposition of the ports being such that with the ram case and sleeve in their uppermost position oil under pressure admitted to said inlet passage will pass into the upper and lower chambers of the ram case and, due to the greater area of the latter chamber, move the ram case downward, forcing the oil in the upper chamber to flow into said lower chamber and, toward the termination of its downward stroke, move said sleeve to change the position of the ports to close the inlet to said lower chamber and permit oil pressure in the upper chamber to move said sleeve still lower to open said outlet port and move said inlet port beyond the end of the piston to permit the pressure oil in the lower chamber of the ram case to pass through said port into said sleeve chamber, and a plunger valve operating automatically in the downward movement of the ram case to admit pressure oil to said sleeve chamber and in the upward stroke of the ram case to place said sleeve chamber in communication with said outlet passage to permit the escape of oil from said sleeve chamber as the sleeve is raised by the ram case.

13. A hydraulic motor for a tramper comprising in combination, a fixed, depending piston-rod having at its lower end a unitary piston provided with inlet and outlet passages each having a port, a sleeve of greater length than the piston slidably mounted thereon having a lower closed end providing a chamber between itself and the lower end of the piston and having an upper outlet and a lower inlet port adapted to cooperate with corresponding ports of the piston, a ram case of greater length than the sleeve slidably mounted thereon, providing upper and lower sealed chambers and adapted at the end of its upward and downward movements to move said sleeve in a corresponding direction, and the latter being responsive to oil pressure in said chambers, a valve chamber provided in said piston and having a port in constant communication with said sleeve chamber, an outlet port, and an inlet port extending through the wall of said chamber, a port in said sleeve in constant communication with the lower chamber of the ram case and registering with said inlet port of the valve chamber when the sleeve is in its uppermost position, and a plunger valve slidably mounted in said valve chamber normally subject to oil pressure on its lower end and adapted to be forced downward by the ram case in the downward movement of the latter prior to the downward movement of the sleeve to close the outlet port of the valve chamber and admit pressure oil through said inlet port to the sleeve chamber and to said valve chamber above the valve, to balance pressures on said sleeve and valve, and to be moved upward by oil pressure in the upward movement of the ram case, prior to the upward movement of the sleeve, to permit pressure oil to escape from said sleeve chamber through said outlet port.

14. A hydraulic motor for a tramper comprising, in combination, a fixed, depending, hollow piston-rod having an inlet for pressure oil at its upper end, a piston secured on the lower end thereof having an inlet passage forming a continuation of said piston-rod and an outlet passage, an outlet pipe extending through said hollow piston-rod and of less diameter than the same and forming a continuation of said outlet passage, each of said passages having a port, a sleeve slidably mounted on the piston having a closed bottom providing, with the bottom of the piston, a sleeve-chamber, a ram case slidably mounted on said sleeve and having its upper end sealed about said piston-rod to slide thereon, said ram case providing upper and lower pressure chambers, to the pressures in which said sleeve is responsive, said upper chamber being in constant communication with said inlet passage and its pressure area being reduced by said piston-rod below that of the lower chamber, an inlet and an outlet port in said sleeve cooperating with the corresponding ports in said inlet and outlet passages for controlling the admission and discharge of pressure oil to and from said lower chamber, whereby, with the ram case and sleeve in their uppermost position, pressure oil from said inlet will pass to said lower chamber and force the ram case downward to cause the upper end thereof to engage said sleeve and, supplemented by pressure in the upper chamber, move it downward to change the position of the ports so as to close the inlet to the lower chamber and permit pressure oil to discharge therefrom, while pressure oil entering said upper chamber will thereafter raise the ram case and cause its lower end to engage and raise said sleeve to its uppermost position, and means operating automatically in the described movements of the ram case and sleeve to cause the application of pressure within, or its removal from, said sleeve chamber, to permit the movements of the sleeve.

15. A hydraulic motor for a tramper comprising, in combination, a fixed, depending piston-rod having at its lower end a stationary piston provided with inlet and outlet passages, each having a port, a sleeve slidably mounted on the piston, having a closed bottom, and having ports adapted to cooperate, respectively, with the ports in the piston, a ram case of greater length than the sleeve slidably mounted thereon providing sealed chambers above and below the sleeve, the lower chamber having a greater pressure area than the upper chamber, and adapted at the end of its downward and upward movements to move said sleeve in a corresponding direction, a port in said piston affording constant communication between said inlet passage and the upper chamber of the ram case, and means for controlling the entrance of pressure oil to and its escape from the sleeve chamber to govern the movements thereof, comprising a valve chamber in said piston having at its lower end a small port communicating with the inlet passage, at a distance therefrom an outlet port communicating with said outlet passage, a third port in constant communication with said sleeve chamber and a fourth port leading through the wall of said valve chamber, a port in said sleeve normally registering with said fourth port and communicating with the lower chamber of the ram case, and a plunger valve slidably mounted in said valve chamber adapted to be lowered in the downward movement of the ram case before the sleeve is lowered thereby, and to be raised by oil pressure in the upward movement of the ram case before said sleeve is moved thereby, said valve, in its movements controlling said outlet port, and passing over and beyond said fourth port in either direction.

16. A hydraulic motor according to claim 4, in which a port is provided between the inlet and said upper chamber which is reduced in area from its upper to its lower end and a collar carried on the interior of said sleeve and slidable over said piston and port, whereby in the downward movement of the sleeve the same will be cushioned by the increasing resistance offered by the oil forced through said port.

17. A double-acting hydraulic motor comprising a stationary piston, a reciprocable cylinder co-operating therewith and providing working chambers on opposite sides of said piston having different pressure areas, a floating sleeve slidably mounted on said piston and a slide valve mounted in said piston but mechanically unconnected therewith, said sleeve and piston being provided with co-operating ports and the sleeve and valve being automatically actuated upon the admission of pressure liquid to the cylinder to cause the reciprocation of the latter.

18. A double-acting hydraulic motor comprising a stationary piston, a reciprocable cylinder co-operating therewith, and providing working chambers on opposite sides of said piston having different pressure areas, a floating sleeve slidably mounted on said piston in an annular space between the piston and cylinder and having sealing contact with said piston and cylinder, and a slide valve mounted in said piston but mechanically unconnected therewith, said sleeve and piston being provided with co-operating ports and the sleeve and valve being automatically actuated upon the admission of pressure liquid to the cylinder to cause the reciprocation of the latter.

19. A double-acting hydraulic motor comprising a stationary piston, a reciprocable cylinder mounted thereon and providing working chambers on opposite sides of said piston of different pressure areas, means for supplying pressure liquid simultaneously to both of said chambers to cause the cylinder to be moved in one direction by differential pressure, and automatic means located and operated within said cylinder to shut off the flow of pressure liquid to the chamber having the greater pressure area and permit the discharge of liquid therefrom, whereby the force of the pressure liquid in the other chamber will be exerted to move the cylinder in the opposite direction.

DOUGLAS JOHNSTON.